US012689292B2

(12) United States Patent (10) Patent No.: US 12,689,292 B2

Mansri et al. (45) Date of Patent: Jul. 21, 2026

(54) DIRECT CURRENT (DC)-DC CONVERTER OPERATIONAL MODE TRANSITION WITH LIMITED VOLTAGE UNDERSHOOT OR OVERSHOOT

(71) Applicant: NXP USA, Inc., Austin, TX (US)

(72) Inventors: Mohammed Mansri, Chandler, AZ (US); Ondrej Pauk, Chandler, AZ (US); John Ryan Goodfellow, Mesa, AZ (US)

(73) Assignee: NXP USA, Inc., Austin, TX (US)

( * ) Notice: Subject to any disclaimer, the term of this patent is extended or adjusted under 35 U.S.C. 154(b) by 342 days.

(21) Appl. No.: 18/238,336

(22) Filed: Aug. 25, 2023

(65) Prior Publication Data

US 2025/0070666 A1 Feb. 27, 2025

(51) Int. Cl.
H02M 1/32 (2007.01)
H02M 1/08 (2006.01)
H02M 3/158 (2006.01)

(52) U.S. Cl.
CPC ............. H02M 3/158 (2013.01); H02M 1/08 (2013.01); H02M 1/32 (2013.01)

(58) Field of Classification Search
CPC ........ H02M 3/158; H02M 3/157; H02M 1/08; H02M 1/32; H02M 1/0025; H02M 1/0032; H02H 9/04
See application file for complete search history.

(56) References Cited

U.S. PATENT DOCUMENTS

| | | | |
|---|---|---|---|
| 8,035,365 B2 | 10/2011 | Kikuchi | |
| RE43,291 E | 4/2012 | Groom | |
| 9,722,490 B2 | 8/2017 | Archibald | |
| 10,218,254 B1 * | 2/2019 | Neyra | H02M 1/08 |
| 2006/0273772 A1 * | 12/2006 | Groom | H02M 3/157 |
| | | | 323/284 |
| 2008/0218284 A1 * | 9/2008 | Chen | H03K 7/10 |
| | | | 332/108 |
| 2019/0081546 A1 | 3/2019 | Hsu et al. | |

(Continued)

FOREIGN PATENT DOCUMENTS

| | | |
|---|---|---|
| TW | 201517476 X | 5/2015 |

OTHER PUBLICATIONS

Texas Instruments, "2-MHz 600-mA Step-Down DC-DC Converter With Mode Control", SNVS426C—Nov. 2006, Revised May 2013, 27 pgs.

*Primary Examiner* — Monica Lewis

*Assistant Examiner* — Jye-June Lee

(57) ABSTRACT

Embodiments of a circuit for a direct current (DC)-DC converter and DC-DC converters are disclosed. In an embodiment, a circuit for a DC-DC converter includes a resistive divider connected to an electrical terminal of the DC-DC converter, an amplifier connected to the resistive divider, a clock synchronization unit connected to a control circuit of the DC-DC converter and configured to generate control signals for the control circuit for switching the DC-DC converter between different operational modes, a first comparator connected to the amplifier and to the control circuit of the DC-DC converter, a second comparator connected to the resistive divider and to the control circuit of the DC-DC converter, and a voltage generator connected to the first comparator and configured to generate a comparator input voltage for the first comparator in response to an output voltage from the amplifier.

19 Claims, 5 Drawing Sheets

(56) References Cited

U.S. PATENT DOCUMENTS

| | | | |
|---|---|---|---|
| 2020/0127561 A1 * | 4/2020 | Takada | H02M 3/156 |
| 2023/0261575 A1 | 8/2023 | Biziitu et al. | |
| 2023/0291301 A1 * | 9/2023 | Sivaraj | H02M 1/08 |

* cited by examiner

DIRECT CURRENT (DC)-DC CONVERTER OPERATIONAL MODE TRANSITION WITH LIMITED VOLTAGE UNDERSHOOT OR OVERSHOOT

BACKGROUND

A direct current (DC)-DC converter can be used to convert input power with an input DC voltage to an output signal at a desired output DC voltage. A DC-DC converter may operate in various operational modes and switch or transit between different operational modes. For example, a DC-DC converter can perform mode transition between a low-power operational mode with a low quiescent current and a normal (high power) operational mode. However, during the transition from one operational mode to another operational mode, a voltage glitch may occur, which can trigger an overvoltage or undervoltage that may corrupt the function of the DC-DC converter or damage a load of the DC-DC converter. In addition, because the supply or output voltage for a load (e.g., a microcontroller) of a DC-DC converter is typically low, the tolerance to voltage glitches may be limited. Therefore, there is a need for a DC-DC regulator technology to limit the voltage undershoot or overshoot during the transition between different operational modes in a DC-DC regulator.

SUMMARY

Embodiments of an operational mode transition circuit for a DC-DC converter and DC-DC converters are disclosed. In an embodiment, an operational mode transition circuit for a DC-DC converter includes a resistive divider connected to an electrical terminal of the DC-DC converter, an amplifier connected to the resistive divider, a clock synchronization unit connected to a control circuit of the DC-DC converter and configured to generate control signals for the control circuit for switching the DC-DC converter between different operational modes, a first comparator connected to the amplifier and to the control circuit of the DC-DC converter, a second comparator connected to the resistive divider and to the control circuit of the DC-DC converter, and a voltage generator connected to the first comparator and configured to generate a comparator input voltage for the first comparator in response to an output voltage from the amplifier. Other embodiments are also described.

In an embodiment, the different operational modes include a pulse frequency modulation (PFM) operational mode and a pulse width modulation (PWM) operational mode.

In an embodiment, the circuit further includes a resistor-capacitor (RC) circuit connected to the amplifier.

In an embodiment, the RC circuit includes a resistor and a capacitor.

In an embodiment, the voltage generator includes a switch connected to the RC circuit, a second amplifier connected to the switch, and a switchable capacitor circuit connected to the second amplifier.

In an embodiment, a control signal from the control circuit is applied to the amplifier and to the second amplifier.

In an embodiment, the amplifier includes a first input terminal connected to a first reference voltage and a second input terminal configured to receive an output voltage of the resistive divider.

In an embodiment, the second comparator is connected to a second reference voltage.

In an embodiment, the amplifier includes an output terminal connected to an input terminal of the first comparator.

In an embodiment, the first and second comparators are configured to cause the control circuit of the DC-DC converter to control a high-side (HS) switch and a low-side (LS) switch of the DC-DC converter for switching the DC-DC converter between the different operational modes.

In an embodiment, at least one of the HS switch and the LS switch includes a bipolar junction transistor (BJT) or a metal-oxide semiconductor field-effect transistor (MOS-FET).

In an embodiment, an output inductor and an output capacitor are connected between two electrical terminals of the DC-DC converter.

In an embodiment, the circuit further includes the control circuit.

In an embodiment, a DC-DC converter includes an operational mode transition circuit, a high-side (HS) driver, an HS switch connected to the HS driver, a low-side (LS) driver, an LS switch connected to the LS driver, and a control circuit connected to the operational mode transition circuit and configured to control the HS driver, the HS switch, the LS driver, and the LS switch for switching the DC-DC converter between different operational modes. The operational mode transition circuit includes a resistive divider connected to an electrical terminal of the DC-DC converter, an amplifier connected to the resistive divider, a clock synchronization unit connected to the control circuit of the DC-DC converter and configured to generate control signals for the control circuit for switching the DC-DC converter between the different operational modes, a first comparator connected to the amplifier and to the control circuit of the DC-DC converter, a second comparator connected to the resistive divider and to the control circuit of the DC-DC converter, and a voltage generator connected to the first comparator and configured to generate a comparator input voltage for the first comparator in response to an output voltage from the amplifier.

In an embodiment, the different operational modes include a low-power operational mode and a high-power operational mode.

In an embodiment, the low-power operational mode includes a PFM operational mode, and wherein the high-power operational mode includes a PWM operational mode.

In an embodiment, the operational mode transition circuit further includes an RC circuit connected to the amplifier.

In an embodiment, the voltage generator includes a switch connected to the RC circuit, a second amplifier connected to the switch, and a switchable capacitor circuit connected to the second amplifier.

In an embodiment, the control circuit is configured to generate a bias signal for the amplifier and the second amplifier.

In an embodiment, an operational mode transition circuit for a DC-DC converter includes a resistive divider connected to an electrical terminal of the DC-DC converter, an amplifier connected to the resistive divider, a clock synchronization unit connected to a control circuit of the DC-DC converter and configured to generate control signals for the control circuit for switching the DC-DC converter between a pulse frequency modulation (PFM) operational mode and a pulse width modulation (PWM) operational mode, a first comparator connected to the amplifier and to the control circuit of the DC-DC converter, a second comparator connected to the resistive divider and to the control circuit of the DC-DC converter, a resistor-capacitor (RC) circuit connected to the amplifier, wherein the RC circuit comprises a resistor and a capacitor, and a voltage generator connected to the first comparator and the RC circuit and configured to generate a comparator input voltage for the first comparator in response to an output voltage from the amplifier. The voltage generator includes a switch connected to the RC circuit, a second amplifier connected to the switch, and a switchable capacitor circuit connected to the second amplifier, and a control signal from the control circuit is applied to the amplifier and to the second amplifier.

Other aspects in accordance with the invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

Figure 1:
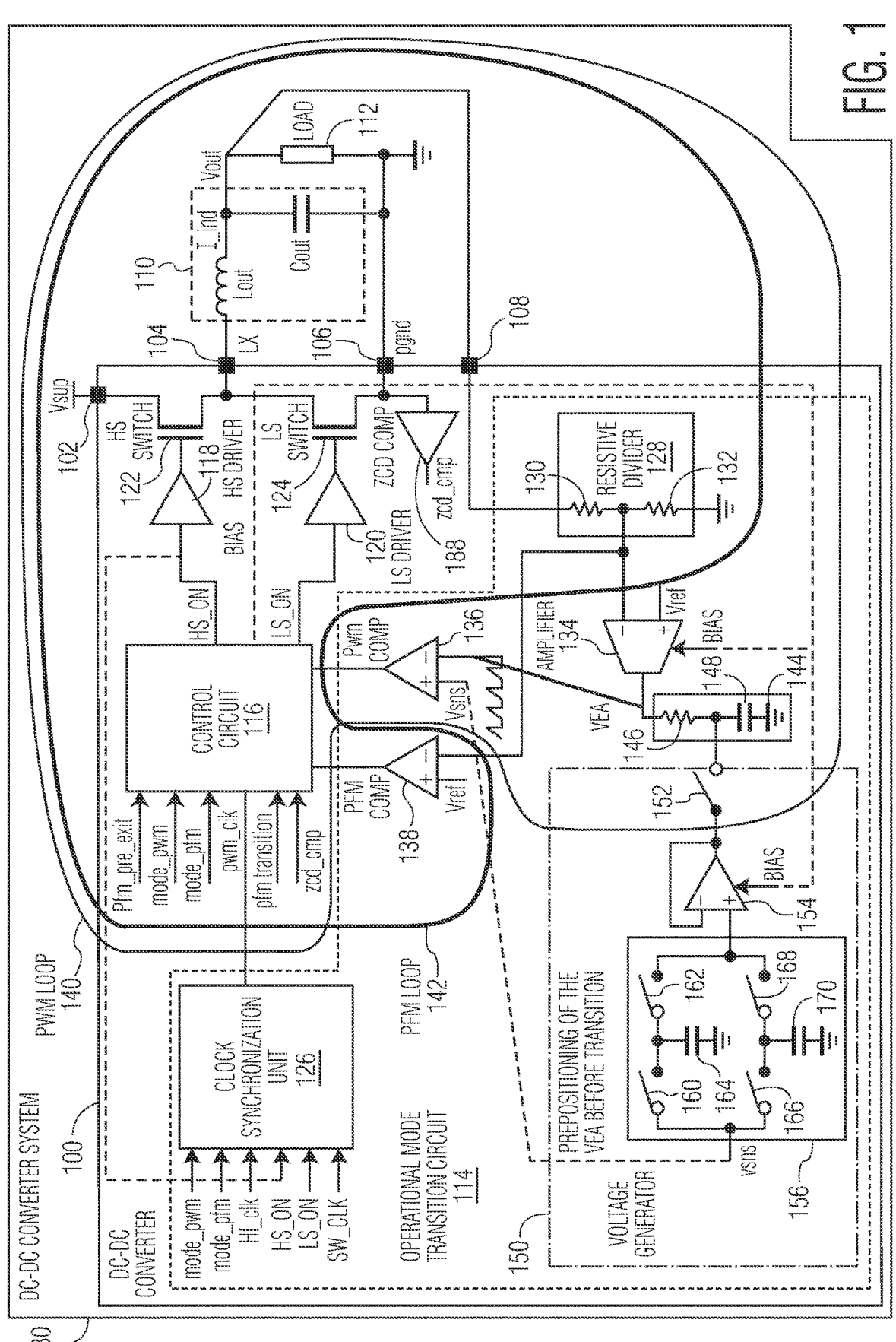
FIG. 1 depicts a DC-DC converter in accordance with an embodiment of the invention.

FIG. 1 is a schematic block diagram of a DC-DC converter 100 in accordance with an embodiment of the invention. The DC-DC converter converts input power with an input or supply DC voltage $V_{SUP}$, which is received from an input or supply electrical terminal or pin 102 into an output signal with a desired output DC voltage $V_{out}$. In the embodiment depicted in FIG. 1, a load 112 is connectable to the DC-DC converter through an inductor-capacitor (LC) network 110, which includes an external inductor Lout and an external capacitor Cout, through electrical terminals or pins 104, 106, 108. The DC-DC converter can be used in various applications, such as automotive applications, communications applications, industrial applications, medical applications, computer applications, and/or consumer or appliance applications. In some embodiments, the DC-DC converter is included in a computing device, such as a smartphone, a tablet computer, a laptop, etc. In some embodiments, the DC-DC converter is implemented in a substrate, such as a semiconductor wafer. In an embodiment, the DC-DC converter is constructed as a stand-alone semiconductor IC chip. In the embodiment depicted in FIG. 1, the DC-DC converter is a Buck DC-DC converter in which the input or supply voltage, $V_{SUP}$, is higher than the output voltage, $V_{OUT}$. However, in some embodiments, the DC-DC converter is a Boost DC-DC converter in which the input or supply voltage, $V_{SUP}$, is lower than the output voltage, $V_{OUT}$. In some embodiments, the DC-DC converter 100 is included in an Integrated Circuit (IC) chip (e.g., a system-on-chip (SoC)) while the LC network 110 and the load 112 are included in a printed circuit board (PCB). For example, the DC-DC converter 100 and the LC network 110 are included in a DC-DC converter system 180. An enablement signal can be switched to, for example, "0" to turn off the DC-DC converter 100 or switched to, for example, "1" to turn on the DC-DC converter 100.

In the embodiment depicted in FIG. 1, the DC-DC converter 100 includes the input or supply electrical terminal or pin 102, the electrical terminals or pins 104, 106, 108, a control circuit 116, a high-side (HS) driver 118, a low-side (LS) driver 120, an HS switch 122, an LS switch 124, a zero crossing detect (ZCD) comparator 188, and an operational mode transition circuit 114 configured to switch or transit the DC-DC converter 100 between different operational modes. Although the DC-DC converter 100 is shown in FIG. 1 as including certain circuit elements, in other embodiments, the DC-DC converter may include less or more circuit elements to implement less or more functions. In some embodiments, the control circuit 116 is a component of the operational mode transition circuit 114.

In the embodiment depicted in FIG. 1, the DC-DC converter 100 can operate in various operational modes and switch or transit between different operational modes. The DC-DC converter can perform mode transition between a low-power operational mode with a low quiescent current and a normal (high power) operational mode. For example, in automotive applications, modes of operation of power management ICs may include a main operational mode where the accuracy and efficiency at high load is required, a low-power operational mode where the efficiency at low load is more important to make sure that the battery can tolerate long time period without charging, and an OFF mode in which all blocks are turned off only a wake-up module is ON.

In the embodiment depicted in FIG. 1, the DC-DC converter 100 can operate in a pulse frequency modulation (PFM) operational mode, which is a low-power operational mode with a low quiescent current, or in a pulse width modulation (PWM) operational mode, which is a normal (high-power) operational mode.

During the transition between different operational modes (e.g., the PFM operational mode and the PWM operational mode), a voltage glitch in the output voltage Vout can trigger an overvoltage or undervoltage that may corrupt the function of the DC-DC converter 100 or damage the load 112 of the DC-DC converter. In addition, because the supply or output voltage Vout for the load (e.g., a microcontroller) is typically low, the voltage glitch tolerance of the load is normally limited. The operational mode transition circuit 114 can limit the voltage undershoot or overshoot during the transition between different operational modes in the DC-DC regulator. A transition from a low-power operational mode with a low quiescent current to a normal (high power) operational mode can use two loops. A first loop is used in the low-power operational mode where the quiescent current is low, a second loop is used in the normal (high power) operational mode where accuracy, current capability and power efficiency at high load is required (e.g., with a constant switching frequency). In some embodiments, the operational mode transition circuit 114 performs smooth transition from one operational mode to another operational mode by prepositioning the operating point of a corresponding operational loop to the right position and performing the operational mode transition at the right moment in order to limit the undershoot and the overshoot on the output voltage Vout.

In the DC-DC converter 100 depicted in FIG. 1, the control circuit 116 is configured to generate or to set control signals for the HS driver 118, the LS driver 120, the HS switch 122, and the LS switch 124, for example, for switching the DC-DC converter between different operational modes (e.g., the PFM operational mode and the PWM operational mode). For example, the control circuit 116 is configured to generate or to set an enablement or disablement signal HS_ON for the HS driver 118 and the HS switch 122, and to generate or to set an enablement or disablement signal LS_ON for the LS driver 120 and the LS switch 124. In some embodiments, the enablement or disablement signal HS_ON is also applied to the operational mode transition circuit 114 to control one or more circuit components of the operational mode transition circuit 114 (e.g., a rising or falling edge of the enablement or disablement signal HS_ON starts one or more circuit components of the operational mode transition circuit 114). In some embodiments, the control circuit 116 is configured to generate or to set a bias signal to bias one or more circuit components (e.g., the amplifier 134 and the amplifier 154) of the operational mode transition circuit 114. The control circuit 116 may be implemented by at least one processor (e.g., a microcontroller, a digital signal processor (DSP), a central processing unit (CPU), or an embedded processor).

In the DC-DC converter 100 depicted in FIG. 1, the HS switch 122 is connected to the input or supply electrical terminal or pin 102 from which the input or supply DC voltage, $V_{SUP}$, is received. The HS switch 122 may be implemented as a transistor, for example, a Bipolar Junction Transistor (BJT) or a Metal oxide semiconductor field effect transistor (MOSFET). The HS driver 118 is configured to generate a drive signal for the HS switch 122, for example, based on the enablement or disablement signal, HS_ON, from the control circuit 116. The HS driver 118 may be implemented in one or more digital and/or analog circuit elements.

In the DC-DC converter 100 depicted in FIG. 1, the LS switch 124 is connected to the electrical terminal or pin 106, which may be connected to the ground (zero volt). The LS switch 124 may be implemented as a transistor, for example, a BJT or a MOSFET. The LS driver 120 is configured to generate a drive signal for the LS switch 124, for example, based on the enablement or disablement signal, LS_ON, from the control circuit 116. The LS driver 120 may be implemented in one or more digital and/or analog circuit elements.

In the DC-DC converter 100 depicted in FIG. 1, the operational mode transition circuit 114 includes a clock synchronization unit 126, a resistive divider 128 that includes two resistors 130, 132, an amplifier 134, a first comparator 136, a second comparator 138, a resistor-capacitor (RC) compensation circuit 144, and a voltage generator 150. The operational mode transition circuit 114 is configured to switch or transit the DC-DC converter 100 between different operational modes. For example, the operational mode transition circuit 114 may perform mode transition between a low-power operational mode with a low quiescent current and a normal (high power) operational mode. In the low-power operational mode, the quiescent current is kept as low as possible. Although the operational mode transition circuit 114 is shown in FIG. 1 as including certain circuit elements, in other embodiments, the operational mode transition circuit 114 may include less or more circuit elements to implement less or more functions. In an embodiment, the DC-DC converter 100 or a component of the DC-DC converter 100 is packaged as a stand-alone integrated circuit (IC) chip. For example, the DC-DC converter 100 or a component of the DC-DC converter 100 can be implemented in at least one substrate, such as at least one semiconductor wafer. In an embodiment, the operational mode transition circuit 114 is packaged as a stand-alone IC chip. In an embodiment, the control circuit 116, the HS driver 118, the LS driver 120, the HS switch 122, the LS switch 124, and the operational mode transition circuit 114 are packaged in a stand-alone IC chip.

In the embodiment depicted in FIG. 1, the clock synchronization unit 126 is configured to generate clock and control signals for the control circuit 116 based on, for example, control or clock signals mode_pwm, mode_pfm, Hf_clk, sw_clk, HS_on, LS_on. In some embodiments, when the signal mode_pwm is positive (logic 1), the DC-DC converter 100 is in the PWM operational mode, and the pulse width modulation mode is enabled. In some embodiments, when the signal mode_pfm is positive (logic 1), the DC-DC converter 100 is in the PFM operational mode, and the pulse frequency modulation mode is enabled. In some embodiments, in a peak mode, the clock synchronization unit 126 uses the signal HS_ON, while in a valley mode, the clock synchronization unit 126 uses the signal LS_ON. In the embodiment depicted in FIG. 1, the clock synchronization unit 126 generates a clock signal pwm_clk and a control signal pfm_transition that are applied to the control circuit 116. In some embodiments, the effective transition from the PFM operational mode to the PWM operational mode is done on the failing edge on the signal pfm_transition, and the effective transition from the PWM operational mode to the PFM operational mode is done on the rising edge on the signal pfm_transition. In some embodiments, when the signal pfm_pre_exit is set to 0, low quiescent current is enabled, and when the signal pfm_pre_exit is set to 1, low quiescent current is not enabled. Hson_pfm is the signal that controls the high-side when the PFM operational mode is enabled. Pwm_clk is the clock signal used in the PWM operational mode with a fixed switching frequency.

In the embodiment depicted in FIG. 1, the resistive divider 128 is connected to the electrical terminal or pin 108, to the amplifier 134, and to the comparators 136, 138. The resistive divider 128 operates as a feedback resistor bridge. In some embodiments, there is no feedback bridge (i.e., the resistive divider 128) and the output voltage Vout can be applied to the amplifier 134 and the comparators 136, 138.

In the embodiment depicted in FIG. 1, the amplifier 134 is connected to the resistive divider 128 and to the comparators 136, 138. The amplifier 134 may be a transconductance (Gm) amplifier. Specifically, a reference voltage Vref is applied to a positive terminal of the amplifier 134 and a feedback signal from the resistive divider 128 is applied to a negative terminal of the amplifier 134 and to the comparators 136, 138. An output terminal of the amplifier 134 is connected to the RC compensation circuit 144 and the output of the amplifier 134 is applied to the RC compensation circuit 144. The amplifier 134 may be controlled (e.g., enabled or disabled or set to a specific value) by the bias signal that is generated by the control circuit 116 (e.g., a rising or falling edge of the bias signal enables or disables the amplifier 134). In the embodiment depicted in FIG. 1, the amplifier 134 generates an output Vea, which regulates the current delivered to the load 112. In some embodiments, the amplifier 134 is only used in a PWM current mode control in which the switching edge is determined by a clock.

In the embodiment depicted in FIG. 1, the comparator 136 is connected to the amplifier 134, to the control circuit 116, and to the switchable capacitor circuit 156 of the DC-DC converter 100. In some embodiments, a pulse/voltage signal Vsns from the switchable capacitor circuit 156 is applied to a positive terminal of the comparator 136 and a feedback signal from the amplifier 134 is applied to a negative terminal of the comparator 136. In some embodiments, in a PWM current mode, the voltage Vsns is the sum of the current sense voltage and the slope compensation. In some embodiments, in a PWM voltage mode, the voltage Vsns is the PWM ramp. The comparator 136 may be, for example, a pulse-width modulation (PWM) comparator. In the embodiment depicted in FIG. 1, the comparator 136 is configured to cause the control circuit 116 to control the HS switch 122 and the LS switch 124 of the DC-DC converter to regulate the output voltage Vout.

In the embodiment depicted in FIG. 1, the comparator 138 is connected to the amplifier 134, to the resistive divider 128, and to the control circuit 116 of the DC-DC converter 100. In some embodiments, there is no feedback bridge (i.e., the resistive divider 128) and the comparator 138 is connected to the electrical terminal or pin 108. In some embodiments, a reference voltage Vref is applied to a positive terminal of the comparator 138 and a feedback signal from the resistive divider 128 or the electrical terminal or pin 108 is applied to a negative terminal of the comparator 138. The comparator 138 may be, for example, a pulse frequency modulation (PFM) comparator. In the embodiment depicted in FIG. 1, the comparator 138 is configured to cause the control circuit 116 to control the HS switch 122 and the LS switch 124 of the DC-DC converter to regulate the output voltage Vout.

In the embodiment depicted in FIG. 1, the RC compensation circuit 144 includes a resistor 146 and a capacitor 148. The RC compensation circuit 144 may be connected to a fixed voltage, for example, the ground (zero volt). In the embodiment depicted in FIG. 1, the output Vea of the amplifier 134 is applied to the resistor 146. The resistor 146 and the capacitor 148 are connected to the voltage generator 150.

In the embodiment depicted in FIG. 1, the voltage generator 150 includes a switch 152, an amplifier 154, and a switchable capacitor circuit 156. The voltage generator 150 is configured to generate the voltage signal Vsns for the comparator 136. In some embodiments, the voltage signal Vsns is a scaled voltage representation of the current through the HS switch 122 or the LS switch 124 summed with slope compensation, which is used for peak or valley current mode control. The voltage generator 150 utilizes a track and hold circuit, which captures the peak or valley of the voltage signal Vsns waveform for peak or valley current mode control respectively. In the embodiment depicted in FIG. 1, the switch 152 is connected between the resistor 146 and the capacitor 148 of the RC compensation circuit 144, and the output terminal of the amplifier 154 is connected to a negative input terminal of the amplifier 154 and to the switch 152, and a positive input terminal of the amplifier 154 is connected to the switchable capacitor circuit 156. The amplifier 154 may act as a voltage follower to clamp the amplifier 134 and the RC compensation circuit 144 to the appropriate level as dictated by the load current. The switchable capacitor circuit 156 includes four switches 160, 162, 166, 168 and two capacitors 164, 170 that are connected to a fixed voltage, for example, the ground (zero volt). The voltage signal Vsns is outputted from the switchable capacitor circuit 156, for example, to the comparator 136. In some embodiments, the amplifier 154 and the switchable capacitor circuit 156 detect the sum of the current sense and slope compensation information, which is the voltage signal Vsns and force the amplifier 134 and the RC compensation circuit 144 to the value of the voltage signal Vsns. Although the voltage generator 150 is shown in FIG. 1 as including certain circuit elements, in other embodiments, the voltage generator 150 may include less or more circuit elements to implement less or more functions.

In the embodiment depicted in FIG. 1, the DC-DC converter 100 can operate in a pulse width modulation (PWM) operational mode or in a pulse frequency modulation (PFM) operational mode. The operational mode transition circuit 114 can limit the voltage undershoot or overshoot during the transition between the PFM operational mode and the PWM operational mode in the DC-DC regulator. In the embodiment depicted in FIG. 1, when the DC-DC converter 100 operates in the PFM operational mode, the control circuit 116, the HS driver 118, the LS driver 120, the HS switch 122, the LS switch 124, the LC network 110, the load 112, the resistive divider 128, the ZCD comparator 188, and the PFM comparator 138 can form a PFM loop 142. When the DC-DC converter 100 operates in the PWM operational mode, the control circuit 116, the HS driver 118, the LS driver 120, the HS switch 122, the LS switch 124, the LC network 110, the load 112, the resistive divider 128, the amplifier 134, the RC compensation circuit 144, and the PWM comparator 136 can form a PWM loop 140. In some embodiments, the operational mode transition circuit 114 (e.g., the voltage generator 150) performs smooth transition between the PFM operational mode and the PWM operational mode by prepositioning the operating point of a corresponding operational loop to the right position and performing the operational mode transition at the right moment in order to limit the undershoot and the overshoot on the output voltage Vout.

An example of the operation of the DC-DC converter 100 is described as follows. In the PFM operational mode, the comparator 138 is used to detect when the scaled output voltage from the resistive divider 128 is less than the reference voltage Vref. When the scaled output voltage from the resistive divider 128 is below the reference voltage Vref, a pulse of current is supplied to the load 112. No clock is required for the PFM operation. In the PFM operational mode, the high side (HS) switch 122 is turned on (e.g., being conductive) for a time determined by Vout/Vin*Tsw (Tsw is the target switching frequency of the DC-DC converter (this formula (Vout/Vin*Tsw) is valid in case there is no losses). After which, the low side (LS) switch 124 is turn on (e.g., being conductive), in case the second comparator 138 detects that the output is higher than the target, the low side remains ON until the inductor current ramps down to zero, which can be detected by a zero current detect circuit (e.g., the ZCD comparator 188). At this point the LS switch 124 is turned off, providing improved light load efficiency over the PWM mode of operation. The PWM current mode operation regulates the output by varying the inductor current on a cycle-by-cycle basis (clocked) to regulate the output voltage Vout. The output of the amplifier 134 can directly determine the peak or valley of the inductor current depending on peak current mode or valley current mode control or voltage mode control. When transitioning between the PFM operational mode to the PWM operational mode, the amplifier 134 needs to be properly prepositioned and the PWM clock needs to be aligned with the PFM switching frequency in order to minimize the output voltage transition between the two independent control loops. Before the final transition from the PFM mode to the PWM mode, the PWM loop can be activated to allow circuits to be biased, which include the amplifier 134 and the current sense and slope compensation circuits (i.e., the amplifier 154 and the switchable capacitor circuit 156), without impacting the PFM mode control. With these circuits enabled, the amplifier 134 can be programmed by the voltage generator 150 to the Vsns voltage level as dictated by the load current. Prior to transitioning, a zero current detect (ZCD) circuit (e.g., the ZCD comparator 188) can be disabled, allowing the DC-DC converter to switch at a frequency close to the PWM switching frequency. At transition from the PFM operational mode to the PWM operational mode, the amplifier 134 is set to the proper value as dictated by the load and the appropriate clock phase is selected to avoid clock error during the transition, the rising edge of the PWM switching frequency clock is aligned with the PFM switching frequency (the rising edge of the HS_ON signal) in case of the peak mode or voltage mode control. Under the valley mode control, the rising edge of the PWM switching frequency clock is aligned with the PFM switching frequency on the rising edge of the LS_ON signal, which corresponds to the falling edge of the HS_ON signal.

Figure 2:
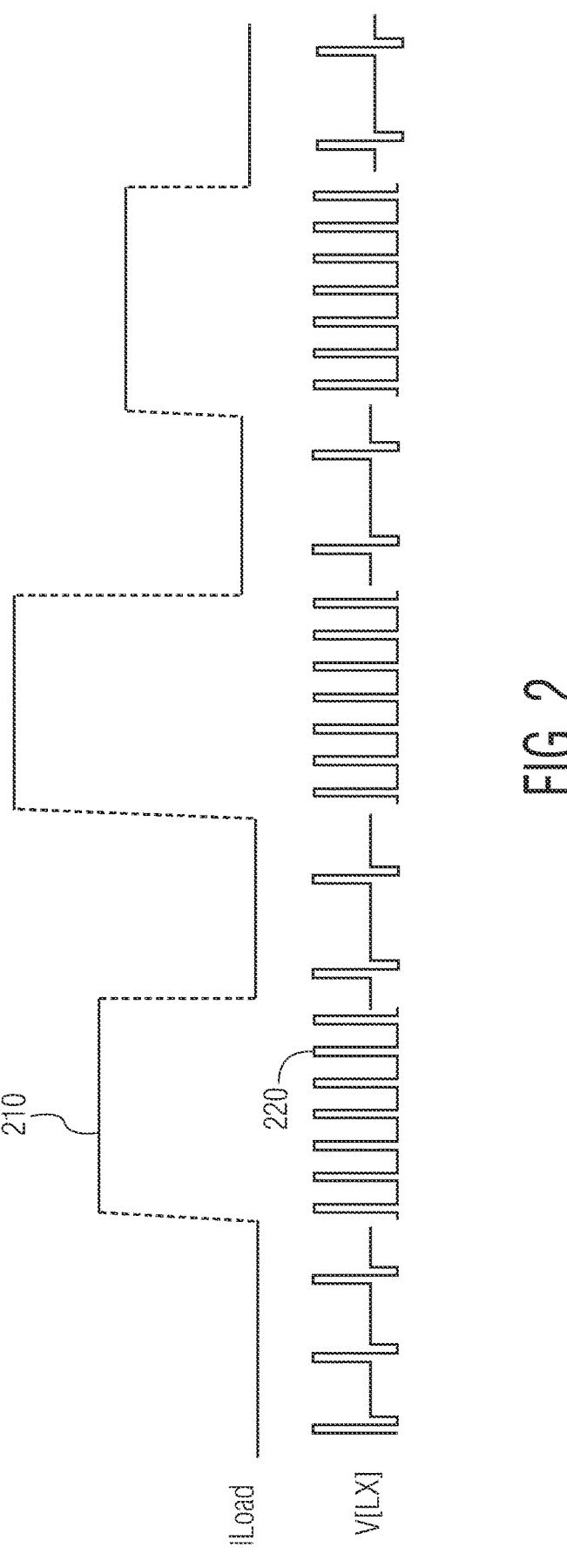
FIG. 2 depicts examples of a load current and a pulse signal of the DC-DC converter depicted in FIG. 1 in a pulse frequency modulation (PFM) operational mode.

FIG. 2 depicts examples of the load current iload and a pulse signal V (LX) of the DC-DC converter 100 depicted in FIG. 1 in the PFM operational mode. The pulse signal V (LX) of the DC-DC converter 100 is the signal at the electrical terminal or pin 104. In the signal diagram depicted in FIG. 2, the load current iload has a waveform 210, and the pulse signal V (LX) has a waveform 220. In the PFM operational mode, the switching frequency is dependent on the load 112 such that the switching frequency varies to meet load demand.

Figure 3:
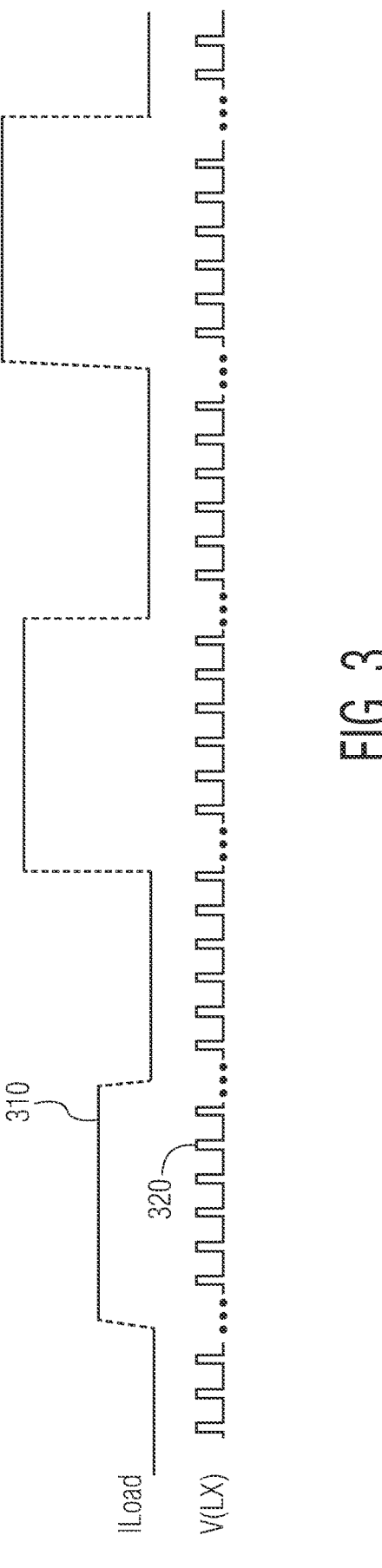
FIG. 3 depicts examples of the load current and the pulse signal of the DC-DC converter depicted in FIG. 1 in a pulse width modulation (PWM) operational mode.

FIG. 3 depicts examples of the load current iload and the pulse signal V (LX) of the DC-DC converter 100 in the PWM operational mode. In the signal diagram depicted in FIG. 3, the load current iload has a waveform 310, and the pulse signal V (LX) has a waveform 320. In the PWM operational mode, the switching frequency is constant. The PWM operational mode may be a voltage mode, a current mode, or a constant on time (COT) mode. In some embodiments, PFM mode control is similar to PWM mode control in that PFM mode control employs a rectangular pulse signal to determine the output voltage Vout of the DC-DC converter 100. However, instead of altering the duty cycle of a pulse signal of a fixed frequency to set the output voltage Vout, PFM mode control alters the frequency of a pulse signal of fixed high side turn on duration (ton). At light load, the switching frequency in the PFM operational mode is low and the switching losses are small. In the PFM operational mode, the efficiency at light load is higher than the efficiency at light load in the PWM operational mode.

Figure 4:
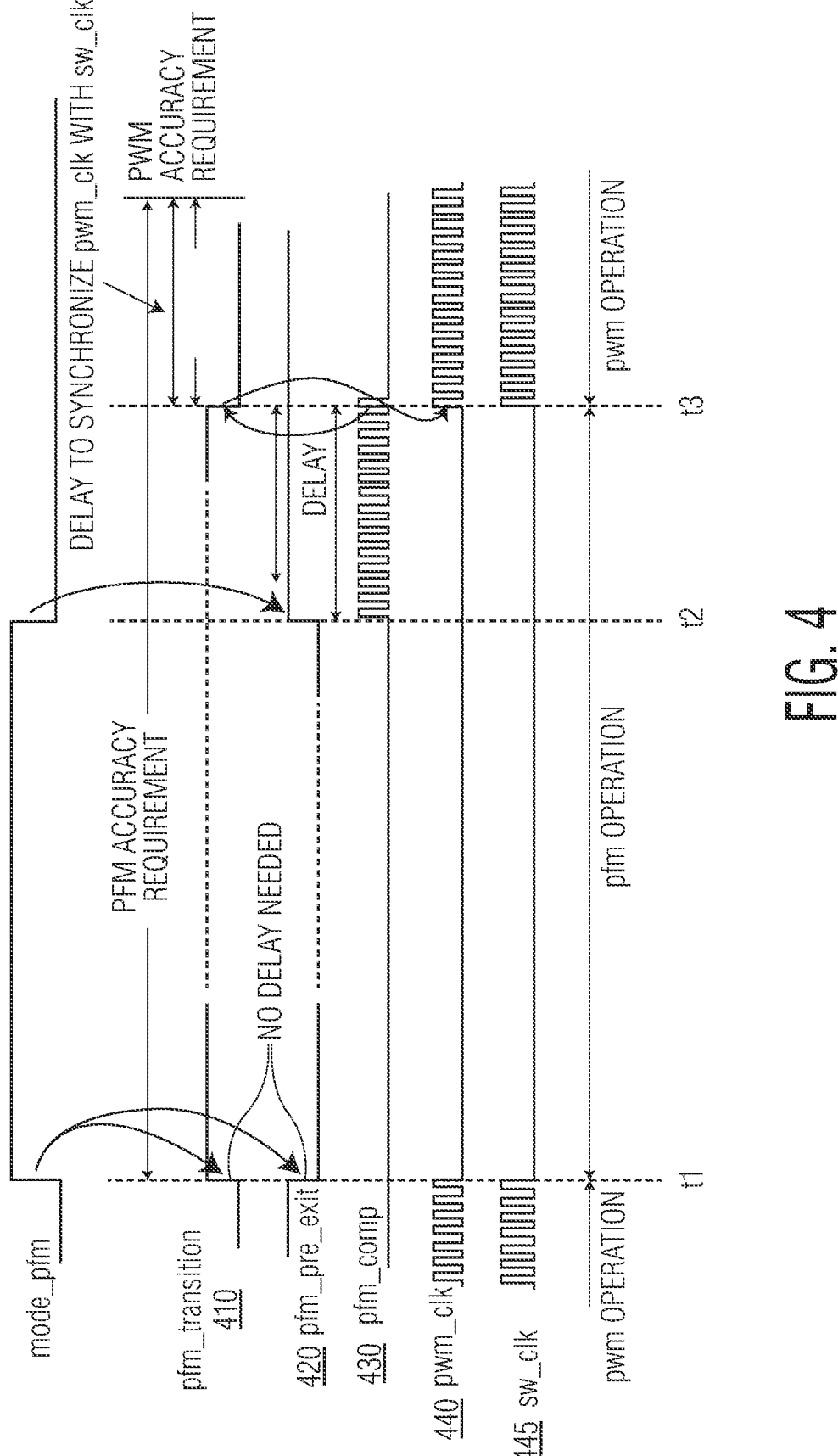
FIG. 4 depicts a signal diagram that corresponds to a transition from the PFM operational mode to the PWM operational mode in the DC-DC converter depicted in FIG. 1.

FIG. 4 depicts a signal diagram that corresponds to a transition from the PFM operational mode to the PWM operational mode in the DC-DC converter 100 depicted in FIG. 1. In the signal timing diagram illustrated in FIG. 4, the pfm_transition signal has a waveform 410, the signal pfm_pre_exit from the clock synchronization unit 126 has a waveform 420, the signal pfm_comp (HS_ON in case of peak mode or a voltage mode control (LS_ON signal in case of valley mode control) signal sent back to the clock synchronization unit 126) has a waveform 430, the PWM switching frequency clock signal pwm_clk has a waveform 440, and the switching clock signal sw_clk has a waveform 445. At time point t1, the PWM operation is switched to the PFM operation. Specifically, at time point t1, the pfm_transition signal 410 changes from 0 to 1, the signal pfm_pre_exit 420 changes from 1 to 0, and the clock signal sw_clk 440 changes to zero, the mode switch from PWM to PFM. At time point t2, the signal pfm_pre_exit 420 changes from 0 to 1 and the ZCD comparator 188 is disabled, the PFM_comp 430 will start to toggle. In some embodiments, when the signal pfm_pre_exit is set to 0, low quiescent current is enabled, and when the signal pfm_pre_exit is set to 1, low quiescent current is not enabled. At time point t3, the PFM operation is switched to the PWM operation. Specifically, at time point t3, the pfm_transition signal 410 changes from 1 to 0, and the clock signal pwm_clk 440 changes from zero to shifting values. After time point t3, the clock signal pwm_clk will be aligned with the clock signal sw_clk 445 step by step by using the HF_clk (high frequency clock).

Figure 5:
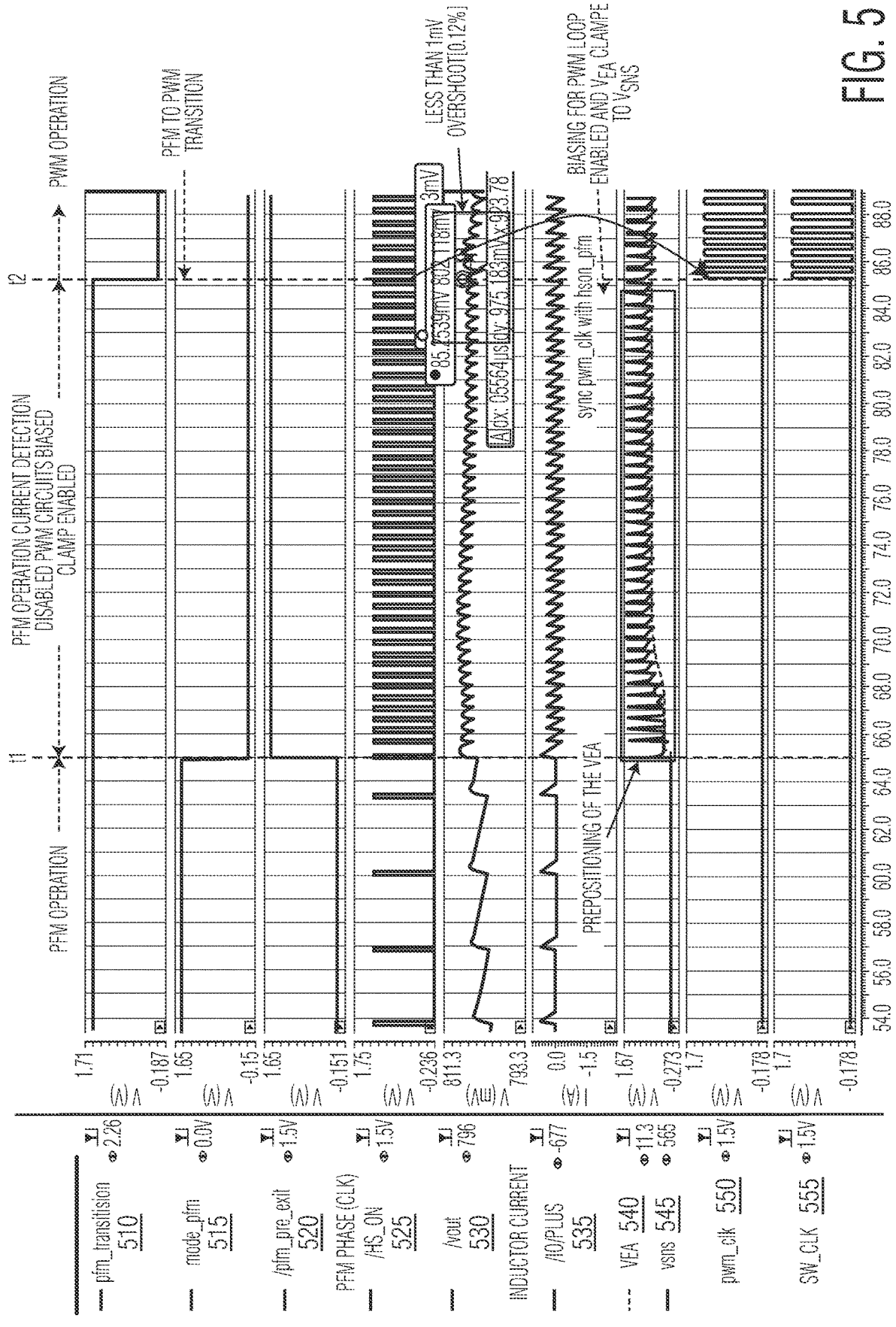
FIG. 5 depicts another signal diagram that corresponds to a transition from the PFM operational mode to the PWM operational mode in the DC-DC converter depicted in FIG. 1.

FIG. 5 depicts another signal diagram that corresponds to a transition from the PFM operational mode to the PWM operational mode in the DC-DC converter 100 depicted in FIG. 1. In the signal timing diagram illustrated in FIG. 5, the pfm_transition signal that is output from the clock synchronization unit 126 in FIG. 1 has a waveform 510, the signal mode_pfm has a waveform 515, the signal pfm_pre_exit from the clock synchronization unit 126 has a waveform 520, the signal HS_ON has a waveform 525, the output voltage Vout of the DC-DC converter has a waveform 530, the inductor current has a waveform 535, the voltage Vea from the amplifier 134 has a waveform 540, the voltage Vsns from the voltage generator 150 has a waveform 545, the clock signal pwm_clk from the clock synchronization unit 126 has a waveform 550, and the switching clock signal sw_clk has a waveform 555. In the signal timing diagram illustrated in FIG. 5, valley current mode control is implemented. At time point t1, the PFM operation starts the transition to the PWM operation, the zero current detection (the ZCD comparator 188) is disabled, PWM circuits (the amplifier 134 and the current sense and slope compensation circuits (i.e., the amplifier 154 and the switchable capacitor circuit 156)) are biased, and clamp is enabled. Specifically, at time point t1, the signal mode_pfm 515 changes from 1 to 0, the signal pfm_pre_exit 520 changes from 0 to 1, and the voltage Vea 540 and the voltage Vsns 545 begin to increase, Vea is pre-positioned to the right value. For example, when the signal pfm_pre_exit is set to 0, low quiescent current is enabled, and when the signal pfm_pre_exit is set to 1, low quiescent current is not enabled. Biasing for the PWM loop 140 is enabled and the voltage Vea is clamped to the voltage Vsns. At time point t2, the PFM operation is transitioned to the PWM operation. Specifically, at time point t2, the pfm transition signal 510 changes from 1 to 0. During the transition from the PFM operation to the PWM operation, the output voltage Vout 530 of the DC-DC converter has less than 1 millivolt (mV) overshoot (about 0.12% overshoot), at time point t2, the rising edge of pwm_clk is synchronized with the falling edge of the signal HS_ON, the phase synchronization of pwm_clk 550 is conducted with the clock signal sw_clk 555 by using the HF_CLK.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods described herein may be implemented using software instructions stored on a computer useable storage medium for execution by a computer. As an example, an embodiment of a computer program product includes a computer useable storage medium to store a computer readable program. The computer-useable or computer-readable storage medium can be an electronic, magnetic, optical, electromagnetic, infrared, or semiconductor system (or apparatus or device). Examples of non-transitory computer-useable and computer-readable storage media include a semiconductor or solid-state memory, magnetic tape, a removable computer diskette, electrically erasable programmable read-only memory (EEPROM), a random access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

Alternatively, embodiments of the invention may be implemented entirely in hardware or in an implementation containing both hardware and software elements. In embodiments which use software, the software may include but is not limited to firmware, resident software, microcode, etc.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A circuit for a direct current (DC)-DC converter, the circuit comprising:
   a resistive divider coupled to an electrical terminal of the DC-DC converter;
   an amplifier coupled to the resistive divider;
   a clock synchronization unit coupled to a control circuit of the DC-DC converter and configured to generate a plurality of control signals for the control circuit for switching the DC-DC converter between different operational modes;
   a first comparator having a first input coupled to the amplifier and an output coupled to the control circuit of the DC-DC converter;
   a second comparator coupled to the resistive divider and to the control circuit of the DC-DC converter; and
   a voltage generator coupled to a second input of the first comparator;
   wherein the voltage generator is configured to generate a comparator input voltage for the first comparator in response to an output voltage from the amplifier.

2. The circuit of claim 1, wherein the different operational modes comprise a pulse frequency modulation (PFM) operational mode and a pulse width modulation (PWM) operational mode.

3. The circuit of claim 1, further comprising a resistor-capacitor (RC) circuit coupled to the amplifier.

4. The circuit of claim 3, wherein the RC circuit comprises a resistor and a capacitor.

5. The circuit of claim 3, wherein the voltage generator comprises a switch coupled to the RC circuit, a second amplifier coupled to the switch, and a switchable capacitor circuit coupled to the second amplifier.

6. The circuit of claim 5, wherein a control signal from the control circuit is applied to the amplifier and to the second amplifier.

7. The circuit of claim 1, wherein the amplifier comprises a first input terminal coupled to a first reference voltage and a second input terminal configured to receive an output voltage of the resistive divider.

8. The circuit of claim 7, wherein the second comparator is coupled to a second reference voltage.

9. The circuit of claim 8, wherein the amplifier comprises an output terminal coupled to an input terminal of the first comparator.

10. The circuit of claim 9, wherein the first and second comparators are configured to cause the control circuit of the DC-DC converter to control a high-side (HS) switch and a low-side (LS) switch of the DC-DC converter for switching the DC-DC converter between the different operational modes.

11. The circuit of claim 10, wherein at least one of the HS switch and the LS switch comprises a bipolar junction transistor (BJT) or a metal-oxide-semiconductor field-effect transistor (MOSFET).

12. The circuit of claim 1, wherein an output inductor and an output capacitor are coupled between two electrical terminals of the DC-DC converter.

13. The circuit of claim 1, further comprising the control circuit.

14. A direct current (DC)-DC converter comprising:

an operational mode transition circuit comprising:

a resistive divider coupled to an electrical terminal of the DC-DC converter;

an amplifier coupled to the resistive divider;

a clock synchronization unit coupled to a control circuit of the DC-DC converter and configured to generate a plurality of control signals for the control circuit for switching the DC-DC converter between different operational modes;

a first comparator coupled to the amplifier and to the control circuit of the DC-DC converter;

a second comparator coupled to the resistive divider and to the control circuit of the DC-DC converter; and a voltage generator coupled to the first comparator and configured to generate a comparator input voltage for the first comparator in response to an output voltage from the amplifier;

a high-side (HS) driver;

an HS switch coupled to the HS driver;

a low-side (LS) driver;

an LS switch coupled to the LS driver; and the control circuit coupled to the operational mode transition circuit and configured to control the HS driver, the HS switch, the LS driver, and the LS switch for switching the DC-DC converter between the different operational modes;

wherein the operational mode transition circuit further comprises a resistor-capacitor (RC) circuit;

wherein the RC circuit includes a resistor, a capacitor, and a center-node;

wherein a first end of the resistor is coupled to the amplifier;

wherein a second end of the resistor is coupled to both the capacitor and the center-node; and wherein the voltage generator is coupled to the center-node.

15. The DC-DC converter of claim 14, wherein the different operational modes comprise a low-power operational mode and a high-power operational mode.

16. The DC-DC converter of claim 15, wherein the low-power operational mode comprises a pulse frequency modulation (PFM) operational mode, and wherein the high-power operational mode comprises a pulse width modulation (PWM) operational mode.

17. The DC-DC converter of claim 14, wherein the voltage generator includes:

a switch coupled to the center-node of the RC circuit, a second amplifier coupled to the switch, and a switchable capacitor circuit coupled to the second amplifier.

18. The DC-DC converter of claim 17, wherein the control circuit is configured to generate a bias signal for the amplifier and the second amplifier.

19. An operational mode transition circuit for a direct current (DC)-DC converter, the operational mode transition circuit comprising:

a resistive divider coupled to an electrical terminal of the DC-DC converter;

an amplifier coupled to the resistive divider;

a clock synchronization unit coupled to a control circuit of the DC-DC converter and configured to generate a plurality of control signals for the control circuit for switching the DC-DC converter between a pulse frequency modulation (PFM) operational mode and a pulse width modulation (PWM) operational mode;

a first comparator coupled to the amplifier and to the control circuit of the DC-DC converter;

a second comparator coupled to the resistive divider and to the control circuit of the DC-DC converter;

a resistor-capacitor (RC) circuit coupled to the amplifier, wherein the RC circuit comprises a resistor and a capacitor; and a voltage generator coupled to the first comparator and the RC circuit and configured to generate a comparator input voltage for the first comparator in response to an output voltage from the amplifier, wherein the voltage generator comprises a switch coupled to the RC circuit, a second amplifier coupled to the switch, and a switchable capacitor circuit coupled to the second amplifier, and wherein a control signal from the control circuit is applied to the amplifier and to the second amplifier.

* * * * *